United States Patent
Liebig et al.

(10) Patent No.: US 6,881,244 B2
(45) Date of Patent: Apr. 19, 2005

(54) METHOD AND DEVICE FOR PREVENTING DEPOSITS IN STEAM SYSTEMS

(75) Inventors: Erhard Liebig, Laufenburg (DE); Robert Svoboda, Wettingen (CH)

(73) Assignee: Alstom Technology LTD, Baden (CH)

( * ) Notice: Subject to any disclaimer, the term of this patent is extended or adjusted under 35 U.S.C. 154(b) by 103 days.

(21) Appl. No.: 10/199,027

(22) Filed: Jul. 22, 2002

(65) Prior Publication Data

US 2003/0015475 A1 Jan. 23, 2003

(30) Foreign Application Priority Data

Jul. 23, 2001 (CH) .............................................. 1363/01

(51) Int. Cl.$^7$ .............................................. B01D 14/00
(52) U.S. Cl. .......................... 95/235; 95/236; 210/698; 422/11; 422/13; 252/390; 134/22.14; 134/22.19; 134/31; 134/37; 134/41; 134/42; 134/2; 134/3
(58) Field of Search ................... 95/235, 236; 210/698; 422/11, 13; 252/390; 134/2, 3, 22.14, 22.19, 31, 37, 41, 42, 20

(56) References Cited

U.S. PATENT DOCUMENTS

| | | | | |
|---|---|---|---|---|
| 2,890,928 A | * | 6/1959 | Osipowe | 422/11 |
| 4,319,895 A | * | 3/1982 | Kemmer | 95/235 |
| 4,476,930 A | * | 10/1984 | Watanabe | 166/279 |
| 4,562,042 A | * | 12/1985 | Moran | 422/13 |
| 5,076,855 A | * | 12/1991 | Kaes | 134/2 |
| 5,779,814 A | * | 7/1998 | Fellers et al. | 134/20 |
| 6,017,399 A | * | 1/2000 | Fellers et al. | 134/20 |

FOREIGN PATENT DOCUMENTS

EP  0902232 A1  3/1999

* cited by examiner

*Primary Examiner*—Minh-Chau T. Pham
(74) *Attorney, Agent, or Firm*—Burns, Doane, Swecker & Mathis, L.L.P.

(57) ABSTRACT

The present invention relates to a method for preventing the deposition of contaminants in steam systems. In a method of this type, deposits are prevented in a simple and economic manner by metering an additive into the steam, which additive adheres to the steam-side surface of the steam system and has the effect of repelling moisture and contaminants.

17 Claims, 4 Drawing Sheets

METHOD AND DEVICE FOR PREVENTING DEPOSITS IN STEAM SYSTEMS

This application claims priority under 35 U.S.C. §§119 and/or 365 to Appln. No. 2001 1363/01 filed in Switzerland on Jul. 23, 2001; the entire content of which is hereby incorporated reference.

FIELD OF THE INVENTION

The present invention relates to a method for preventing the deposition of contaminants in steam systems. The invention also relates to a device for carrying out a method of this type.

BACKGROUND OF THE INVENTION

For reasons of efficiency, steam is increasingly being used as coolant for cooling components of energy machines, for example of a gas turbine installation, which are subject to high thermal loads. This steam can flow through the components which are to be cooled in an open, semi-open or closed system either in the form of steam or in the form of a steam/air mixture.

In an open steam system, the steam is guided from a device for providing steam (heat recovery steam generator, steam turbine installation, auxiliary steam generator, etc.) to the device for using steam, for example a gas turbine installation, in order to cool the components of this device which are heated. The cooling steam, after it has flowed through the cooling system of the gas turbine installation, for example, passes into the working medium of the gas turbine installation and ultimately into the atmosphere together with this medium.

In a semi-open steam system, the steam is guided from a device for providing steam (heat recovery steam generator, steam turbine installation, auxiliary steam generator, etc.) to the device for using steam, for example a gas turbine installation, in order to cool the components of this device which are heated. After it has flowed through the cooling system of the gas turbine installation, the cooling steam is fed to a device for removing steam (heat recovery steam generator, steam turbine installation, technological process, etc.).

In a closed steam system, the device for providing steam (steam cooler, steam blower, steam filter, etc.) is identical to the device for removing steam. Steam with the appropriate parameters is made available to the device for using steam, in this case the gas turbine installation, by the device for providing steam. After it has flowed through the cooling system of the gas turbine installation, the steam is returned to the device for providing steam, in order for the increase in pressure, cooling, cleaning and the like required to maintain the cycle to be carried out.

The various steam systems have been explained with reference to the example of a steam system for cooling gas turbine installations. Although the main function of the steam in this example relates to the cooling of components, during which process the steam is heated, there are also areas within such a system, for example pipelines or fittings, in which the steam is cooled. The steam systems may to a certain extent also be heating systems based on steam. Therefore, the steam systems include both cooling systems, in which the steam is heated, and heating systems, in which the steam is cooled.

In the case of steam injection for increasing power, steam is injected as an additional working medium in order to increase the mass flow of working medium into the gas turbine installation. This may in turn take place in the form of direct injection of steam into the working medium or indirectly after it has flowed through gas turbine components which are to be cooled. However, the steam may also be injected into the working medium indirectly, i.e. after it has flowed through gas turbine components which are to be cooled, in the form of a steam/air mixture, i.e. in combination with cooling air via an open air cooling system.

The steam injection method, i.e. the introduction of steam into the working medium of the gas turbine installation, is also used in the Cheng cycle. In the Cheng cycle, to avoid a steam turbine installation and the systems required for operation of the steam turbine installation, the steam which is generated in the heat recovery steam generator is injected in its entirety into the gas turbine installation.

Contaminants originating from steam-soluble substances in steam which is guided in this manner may lead to deposits forming on components around which the steam flows and therefore cause problems. From the wide range of possible contaminants, the silicates are of particular importance with regard to possible deposits, on account of the problems involved in cleaning make-up water and condensate and the frequent contamination during installation and maintenance work. Therefore, silicates are mentioned as a representative example of the wide range of possible contaminants.

The high-precision components of a gas turbine installation, the small dimensions of the cooling passages, the high demands imposed on the flow conditions and the like result in the need to ensure a high quality of steam. Without this purity, deposits are formed within the steam systems, the performance of the installations is reduced and maintenance work, with corresponding installation shutdown times, become necessary. This is of importance in particular for open and semi-open systems, since in these systems the cooling steam constantly has to be provided as new, and therefore it is always possible for new contaminants to enter the system.

This results, not least, in numerous constraints being imposed on the steam generator technology used, for example with regard to component design (steam drying in drums and separators), the temperature control for the steam by injection of water or mixing of steam, chemical procedures, etc.

It is currently attempted, for steam systems of this type, to ensure a high quality of steam which avoids deposits with considerable reliability, by suitably designing the feed water preparation and the steam generation. For example, numerous steam-mixing methods are known allowing the steam temperature to be controlled without the injection of water. Furthermore, special steam filters, in particular for closed steam systems, are recommended.

For steam applications of this nature, with disadvantageously high technical and therefore also financial outlay, all these approaches are based, for example, on ensuring that very pure make-up water is generated, on ensuring a high level of purity of the feed water in water/steam cycles by means of condensate-cleaning installations, on avoiding contamination to the steam by using suitable processes for generating the steam and controlling its parameters, on removing contaminants from the steam by means of suitable filters, and on preventing chemical interactions, for example corrosion, in the corresponding systems by means of a suitable choice of materials. These measures are used both individually and in combination.

A drawback of these possibilities is that, for example, it is no longer possible to use tried-and-tested chemical procedures for steam generators. Moreover, condensate-cleaning installations, in addition to a high outlay in terms of investment and operating costs, also entail additional risks. Steam filters for separating out particles which are entrained in the steam also only have a limited effect.

Alternatively, however, the prior art, when it is restricted to the field of steam generation or evaporation, i.e. the transfer of water from the liquid state into the vapor state, proposes metering various additives, especially amines, into the feed water, in order, in this limited field, to limit the formation of deposits or to partially eliminate deposits which are already present. For example, U.S. Pat. No. 4,476,930 and U.S. Pat. No. 6,017,399 describe possible ways of limiting deposits in evaporator systems by means of additives, including in combination with a reduction in the levels of corrosion.

SUMMARY OF THE INVENTION

Accordingly, the invention is based on the object of providing a method for preventing the deposition of contaminants in steam systems in which the drawbacks of the prior art are avoided. In particular, it is intended to propose a method in which it is not necessary to use a high level of outlay to remove contaminants from the working medium used for the steam system to the highest possible degree or to prevent even the slightest possible contamination to this medium.

The inventive solution to the above object consists in metering an additive into steam systems of this type, which additive adheres to the steam-side surface of the steam system and has the effect of repelling moisture and contaminants. The essence of the invention therefore consists in using an additive to form a film on the components around which the steam flows, which film can effectively prevent deposits.

The steam systems may be open, semi-open or closed steam systems. The working medium in the steam system may be steam or a steam/air mixture. The steam system may be at least one device for providing steam and at least one device for using steam, and, if appropriate, also a device for removing steam.

From the wide range of possible contaminants, the silicates are of particular importance with regard to possible deposits, on account of the problems involved in cleaning make-up water and condensate and the frequent contamination during installation and maintenance work. Therefore, silicates are mentioned as a representative example of the wide range of possible contaminants.

Recommended additives are film-forming substances, for example amines or related film-forming substances. Amines used may be either monoamines or polyamines. Octadecylamine is a particularly preferred amine. The additives may consist of only one substance or of a mixture of substances. The additives may be metered in in pure form or as an aqueous solution.

Additives usually have a limited service life. This applies in particular to organic substances, the service life of which is dependent on the temperature, on account of thermal decomposition. According to a further preferred embodiment of the method, the limited service life of the additives can advantageously be used to control the film height. However, for reasons of expediency, the additives should have a certain minimum service life, which is at least equal to, but preferably greater than the residence time during flow through the device for steam use. The constant, controlled decomposition of the additive therefore makes it possible to prevent the additive from accumulating within the steam system.

Advantageously, one should only use additives whose thermal decomposition preferably produces only those substances, and only in those amounts or concentrations, which are comparable to the additive in terms of toxicity, combustibility and corrosiveness. The decomposition products are in this case one or more of the following products: $CO$, $CO_2$, $H_2O$, $NH_3$, $H_2$, $N_2$, $NO_2$, short-chain amines.

One embodiment of the invention is characterized in that the additive in the steam system forms a film of a defined height on components around which the steam flows, and in that this film height is controlled during operation by suitable metering of the additive, for example as a function of its service life, and in particular can preferably be set within a controlled range (redefined set range). Finally, the decomposition behavior of the additives also makes it possible to control the film thickness and its composition.

A further preferred embodiment of the above method is based on the additive being metered in periodically or continuously in terms of time and as a function of its service life in terms of quality.

The method can be used in particular for steam systems of gas turbine installations, in particular for systems for injecting steam into the gas turbine installation or for steam cooling of components of a gas turbine installation. It can be used to particularly good effect if the steam flows through the guide vanes and/or rotor blades of the gas turbine installation and deposits are to be prevented in particular in these components.

A further embodiment of the above process is distinguished by the fact that the additive is metered in between the device for providing steam and the device for using steam. In this case, it may be advantageous for the additive to be metered in immediately upstream of the device for using steam.

Furthermore, the invention relates to a device for carrying out the method as described above, comprising a steam system having at least one device for providing steam and at least one device for using steam, and also, if appropriate, having at least one device for removing steam. The device is distinguished by the fact that means are provided which allow the controlled admixing of an additive into the steam system, the additive adhering to the steam-side surface of the steam system and having the effect of repelling moisture and contaminants, and these means preferably being equipped with a control unit, particularly preferably for controlling the film height of the additive on the components of the steam system.

According to a first preferred embodiment of the device according to the invention, the means for the controlled admixing are arranged between the device for providing steam and the device for using steam, if possible immediately upstream of the device for using steam.

The term a device for providing steam is to be understood in particular as meaning a device which generates or provides the steam required for the corresponding use with appropriate parameters (pressure, temperature, mass flow). The device may be a boiler or steam generator, steam mains or, in conjunction with combined-cycle power plants, a heat recovery steam generator or removal/tapping points from steam turbine installations. Steam blowers, steam coolers, steam heaters, steam filters, etc. may also form part of a device for providing steam.

Within the device for using steam, the steam has to fulfill a defined cooling or heating function. In the case of the exemplary embodiment, this function is to cool those components on the hot-gas path of a gas turbine installation which are subject to high thermal loads.

Within the device for removing steam, the steam, after it has left the device for using steam, is utilized or is fed for further energy or materials utilization. This device may be a boiler or steam generator, steam mains, a technological steam consumer, steam cooler, steam heater or, in conjunction with combined-cycle power plants, may be a heat recovery steam generator or steam turbine installation.

To ensure that the steam system is able to function and is ready for operation, the decomposition products of the additive have to be expelled. In the case of open steam systems, this takes place continuously via the working medium, and in the case of the semi-open systems this can be achieved by means of degassing and cleaning devices which are already present, for example within a water/steam cycle. If these conditions are not satisfied or if, as in the case of closed steam systems, there are no such features, the steam systems are furthermore preferably to be equipped with degassing and cleaning devices for separating out and removing decomposition products of the additive.

BRIEF DESCRIPTION OF THE DRAWINGS

The invention is to be explained in more detail below with reference to exemplary embodiments and in conjunction with the drawings, in which.

DETAILED DESCRIPTION OF THE INVENTION

Figure 1:
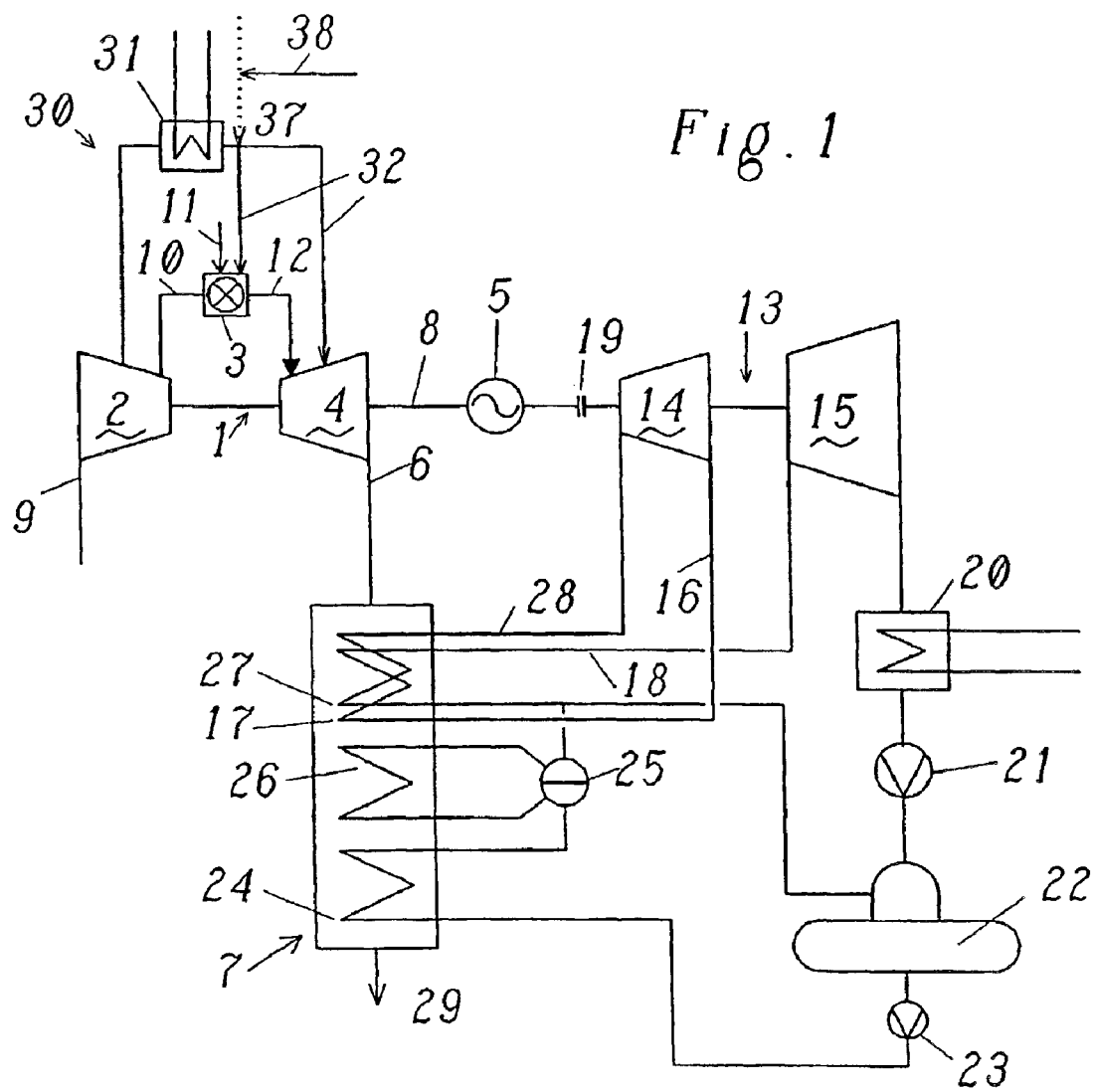
FIG. 1 shows a circuit diagram of a combined-cycle power plant with an open air cooling system.

FIG. 1 shows, as an exemplary embodiment of the method according to the invention, a diagrammatic illustration of a combined-cycle power plant with a single-shaft installation. The water/steam cycle with heat recovery steam generator 7 and steam turbine installation 13 is designed, for example, as a single-pressure process with reheating 17.

In the text which follows, a combined-cycle power plant is understood as meaning the coupling of a gas process and a steam process in the form of a gas turbine installation and a steam turbine installation. The heat from the exhaust gases from the gas turbine of the gas turbine installation is used to generate steam in a heat recovery steam generator. The steam which is generated is utilized to generate current by means of the steam turbine installation.

As shown in FIG. 1, the combined-cycle power plant has a gas turbine installation 1, the exhaust gas 6 from which is fed to a heat recovery steam generator 7. The gas turbine installation 1 comprises a compressor 2, a combustion chamber 3 and a gas turbine 4. The gas turbine 4, the compressor 2 and the generator 5 are arranged on a common shaft 8. Via this common shaft 8, the gas turbine 4 drives both the compressor 2 and the generator 5. The gas turbine installation 1 and the generator 5 are referred to as a gas turbine set. The air which is supplied to the compressor 2 via an intake air line 9, after it has been compressed in the compressor 2, passes as combustion air 10 into the combustion chamber 3. In the combustion chamber 3, fuel supplied via the fuel line 11 is burnt. The hot gas 12 generated in the combustion chamber 3 passes to the gas turbine 4, where it is expanded so as to perform work.

The medium which flows through the compressor 2, the combustion chamber 3 and the gas turbine 4, i.e. the gas turbine installation 1, is also referred to as the working medium.

A gas turbine installation may also have a plurality of combustion chambers and a plurality of gas turbines. For example, in the case of gas turbine installations with sequential combustion, a low-pressure combustion chamber with low-pressure turbine are connected downstream of a high-pressure combustion chamber with high-pressure turbine. It is also possible for a gas turbine installation to have a plurality of compressors.

The live steam which is generated in the heat recovery steam generator 7 in a pressure stage is fed via the live-steam line 28 to a steam turbine installation 13. After it has been processed in the high-pressure steam turbine 14 of the steam turbine installation 13, the live steam is fed via the cold reheater steam line 16 to the reheater 17 of the heat recovery steam generator 7, where it is superheated again and passed via the hot reheater steam line 18 to the medium-pressure/low-pressure steam turbine 15 of the steam turbine installation 13.

This steam turbine installation 13 comprises a high-pressure steam turbine 14 and a medium-pressure/low-pressure steam turbine 15. In the present case, the steam turbine installation 13 also drives the generator 5 via a coupling 19. In situations in which the gas turbine installation 1 and the steam turbine installation 13 with the generator 5 are situated on one shaft 8, one can also refer to single-shaft installations. If the gas turbine installation 1, comprising compressor 2, combustion chamber 3 and gas turbine 4, and the steam turbine installation 13 each have their own generator 5, this arrangement is known as a multishaft installation. By analogy to the gas turbine set (gas turbine installation and generator), a steam turbine installation with generator is also known as a steam turbine set.

The steam which has been processed in the steam turbine installation 13 flows into a condenser 20. After the waste steam has been condensed in the condenser 20, the condensate is fed to the feed water tank/degassing unit 22 by the condensate pump 21 and is then degassed and stored.

The feed water pump 23 is used to convey feed water from the feed water tank/degassing unit 22 to an economizer 24, and the feed water then flows from the economizer to the steam-collecting drum 25. The steam-collecting drum is connected to the evaporator 26. The steam-collecting drum 25 is followed by a superheater 27, to which the live-steam line 28, which carries the live steam which has been generated to the high-pressure steam turbine 14 of the steam turbine installation 13, is connected. The saturated steam which is present in the steam-collecting drum 25 is likewise used to degas the condensate in the feed water tank/degassing unit 22.

The economizer 24, the steam-collecting drum 25, the evaporator 26 and the superheater 27 together form a steam generation system which operates at a defined pressure stage.

Modern heat recovery steam generators 7 for large gas turbine installations 1 nowadays have up to three pressure stages. In the present case, a heat recovery steam generator 7 comprising drum/forced circulation evaporator has been described. Therefore, the feed water which has been preheated by the economizer 24 is conveyed into the steam-collecting drum 25. The drum water is circulated in the steam-collecting drum/evaporator system 25, 26 and in the process is partially evaporated. Water and steam are separated in the steam-collecting drum 25. The water is fed back to the evaporator 26, while the steam passes to the steam turbine installation 13, either directly or via a superheater 27 which may be present.

After it has flowed through the heat recovery steam generator 7, the exhaust gas 6 finally passes into the atmosphere via a stack 29.

FIG. 1 also illustrates an open air cooling system 30 having the cooling-air cooler 31 and the cooling-air lines 32. The cooling air is removed from the compressor 2 at a suitable location, is cooled further in a cooling air cooler 31 which may be present and is then used to cool in particular the components of the hot-gas path, i.e. the combustion chamber 3 and the gas turbine 4 of the gas turbine installation 1. After it has flowed through the structures which are to be cooled, the cooling air passes into the working medium of the gas turbine installation 1. As has already been mentioned, steam may be admixed with the cooling air in order to increase the cooling capacity or improve performance of the gas turbine installation 1, at a suitable location 37.

Figure 2:
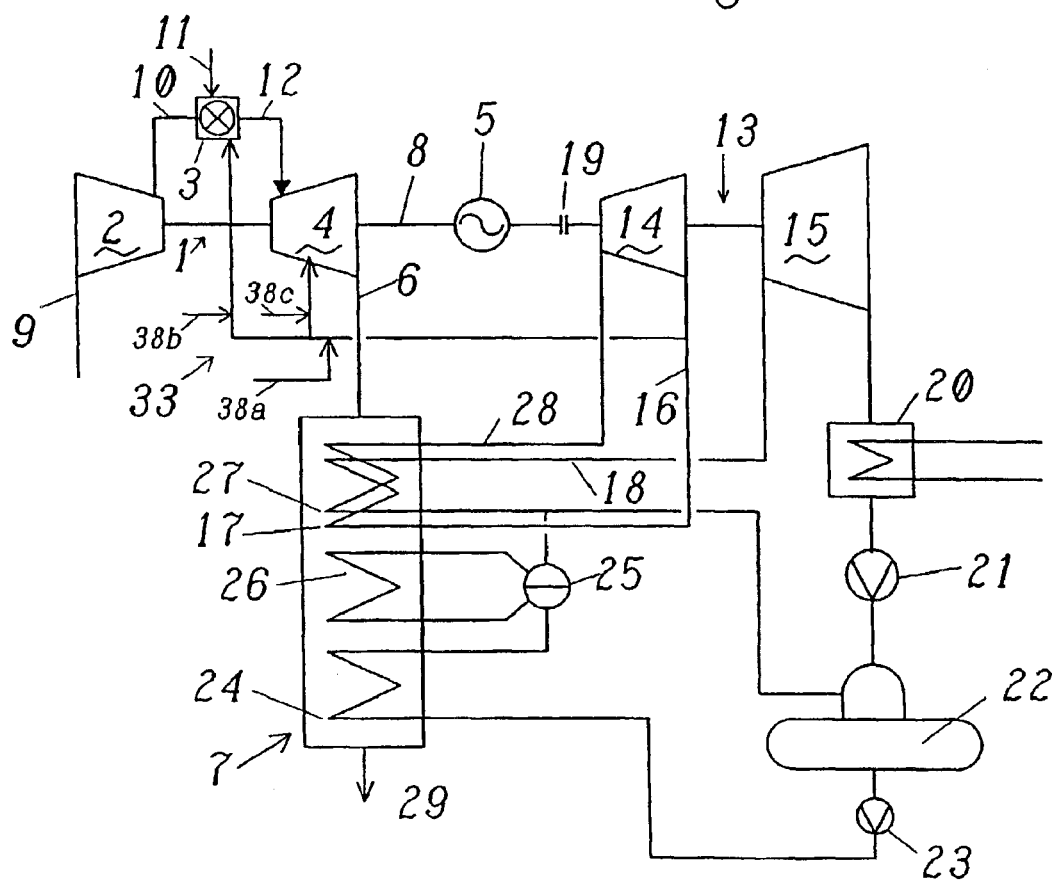
FIG. 2 shows a circuit diagram of a combined-cycle power plant with an open steam cooling system.

FIG. 2 shows an open steam (cooling) system 33. The cooling steam is removed from the heat recovery steam generator 7, the steam turbine installation 13 or, as in the present case, the cold reheater steam line 16 (device for providing steam) at a suitable location and is fed via the steam (cooling) system 33 to the components of the gas turbine installation 1 (device for using steam) which are to be cooled. After it has flowed through the structures which are to be cooled, the cooling steam passes into the working medium of the gas turbine installation 1.

Figure 3:
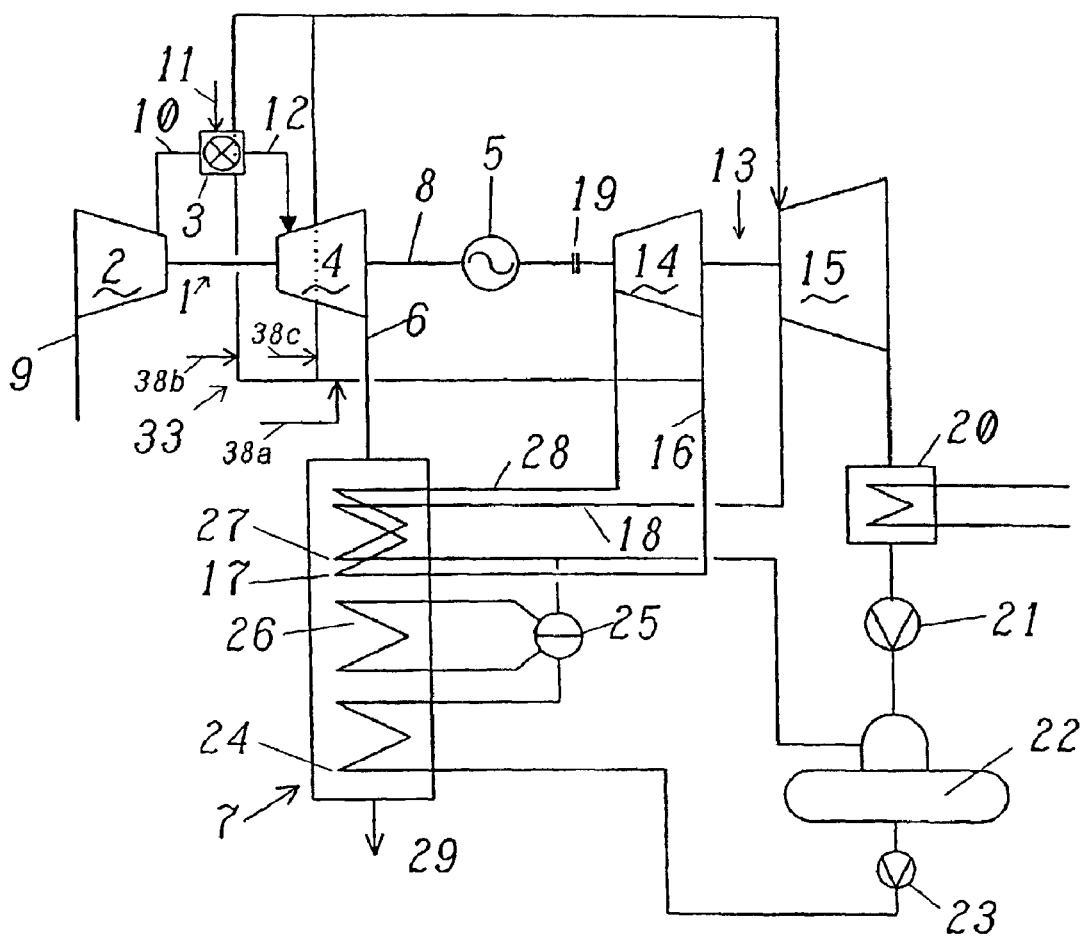
FIG. 3 shows a circuit diagram of a combined-cycle power plant with a semi-open steam cooling system.

FIG. 3 shows a semi-open steam (cooling) system 33. The cooling steam is removed from the heat recovery steam generator 7, the steam turbine installation 13 or, as in the present case, the cold reheater steam line 16 (device for providing steam) at a suitable location and is fed via the steam (cooling) system 33 to the components of the gas turbine installation 1 (device for using steam) which are to be cooled. After it has flowed through the structures which are to be cooled, the cooling steam passes back to the heat recovery steam generator 7, to the water/steam cycle or, as in the present case, to the steam turbine installation 13 (device for removing steam).

In the case of the open and semi-open systems which have to be continuously supplied with steam, the steam-collecting drum 25, the superheater 27, the live-steam line 28, the reheater 17, etc. are recommended as steam-removal points in the region of the heat recovery steam generator 7. However, the steam may also be removed from a tapping or removal point of the steam turbine installation 13 or at some other advantageous location in the water/steam cycle.

In the case of semi-open systems, the heat recovery steam generator 7 or the steam turbine installation 13 are once again recommended for recovery of the steam from the gas turbine installation 1.

Figure 4:
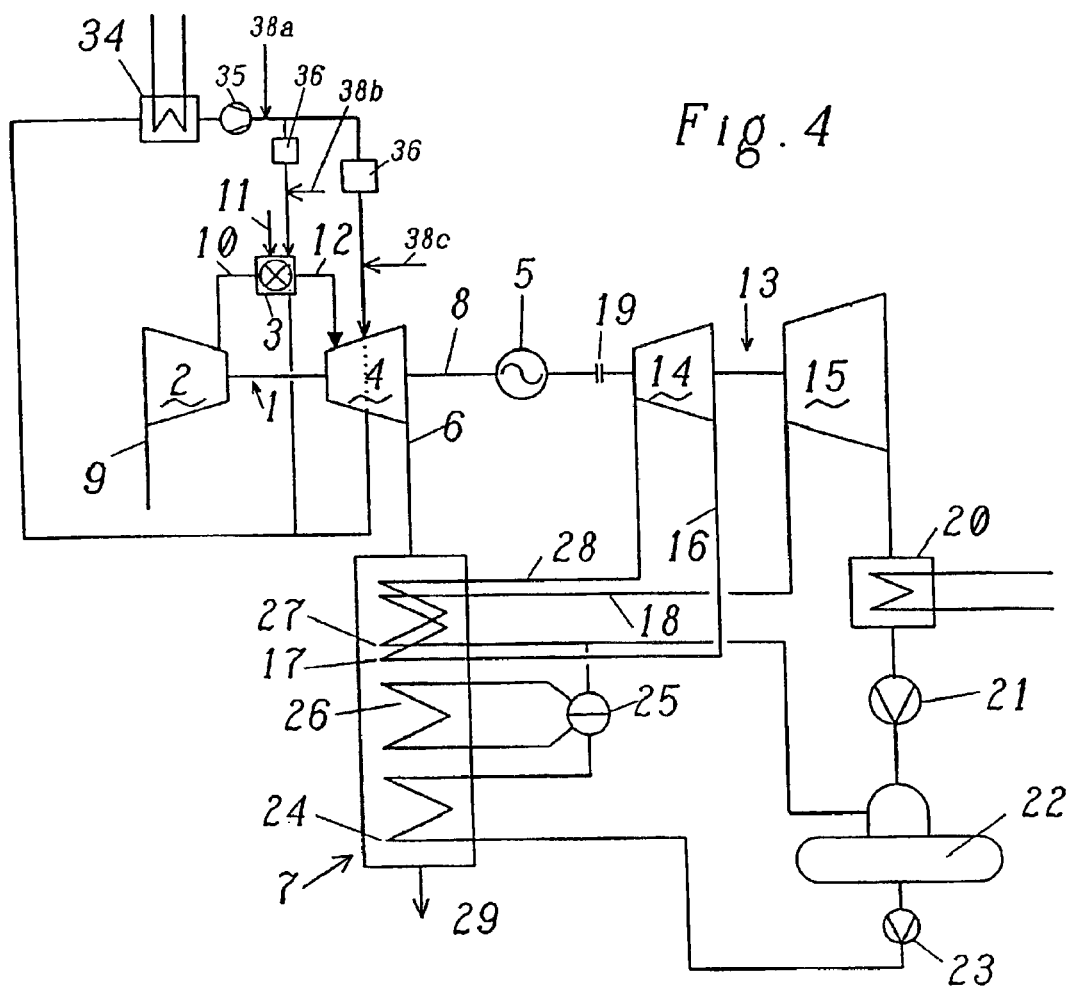
FIG. 4 shows a circuit diagram of a combined-cycle power plant with a closed steam cooling system.

FIG. 4 shows a closed steam (cooling) system. The cooling steam is cooled in the steam cooler 34. A steam blower 35 is used to convey the cooling steam in the steam (cooling) system, i.e. to the components of the gas turbine installation 1 (device for using steam) which are to be cooled and back to the steam cooler 34. The heat which is absorbed through cooling of the components of the gas turbine installation 1 is dissipated via the steam cooler 34. Any steam filters 36 which may be present are expediently arranged immediately upstream of the gas turbine installation 1.

In the text which follows, a device for providing steam is to be understood as meaning a device which generates or provides the steam required for the corresponding use with appropriate parameters (pressure, temperature, mass flow). The device may be a boiler or steam generator, steam mains or, in conjunction with combined-cycle power plants, may be a heat recovery steam generator or removal/tapping points on steam turbine installations. Steam blowers, steam coolers, steam heaters, steam filters, etc. may likewise form part of a device for providing steam.

Within the device for using steam, the steam has to fulfill a defined cooling or heating function. In the case of the exemplary embodiment, this function is to cool those components of the hot-gas path of a gas turbine installation which are subject to high thermal loads.

Within the device for removing steam, the steam, after it has left the device for using steam, is utilized or is fed for further energy or materials use. The device may be a boiler or steam generator, steam mains, technological steam consumer, steam cooler, steam heater or, in conjunction with combined-cycle power plants, may be a heat recovery steam generator or steam turbine installation.

The structure of the water/steam cycle described, of the heat recovery steam generator 7, of the gas turbine installation 1 and of the steam turbine installation 13 is to be considered purely as an example, since, as is generally known, components or systems of this type may be of highly divergent design.

Temperatures in the range from 250° to 580° C. and pressures in the range from 20 to 40 bar typically prevail in steam systems of gas turbine installations (steam injection, steam cooling, etc.).

Particularly in those regions within a steam system in which temperature and/or pressure gradients occur, deposits which lead to problems may readily form. It has been found that surface-active additives have an influence on the deposition of contaminants on the surfaces within steam systems. This property can be used beneficially under a very wide range of conditions within steam systems of gas turbine installations 1 in order to effectively prevent the deposition of contaminants. This is advantageous in particular in the processes for injecting and cooling steam, very particularly if deposits are to be prevented in the interior of guide vanes and/or rotor blades. This may if appropriate be combined with other measures for preventing deposits.

According to the invention, the additives which are to be used to prevent the deposition of contaminants should firstly be able to form a film on the structure surfaces, i.e. they should be able to adhere to the surfaces. Secondly, the additives should have the effect of repelling impurities and moisture, in order in this way to prevent the deposition of impurities.

It should advantageously be possible to limit the build-up of film by the additives, i.e. the film height, or it should be possible to produce a film height within a controlled range (predefined set range). Furthermore, accumulation of additives, in particular at locations which are critical in terms of flow, should be avoided. This can be achieved, for example, as a result of these substances or mixtures of substances which are used as additives having a limited service life. As a result, the additives within the steam system are continuously broken down, and consequently the build-up of a film can be controlled by metering of the additives. In this context, it should be ensured that the decomposition of the additives used as far as possible does not produce any toxic, combustible or corrosive products.

Therefore, the metering requires surface-active additives which accumulate on preferably metallic surfaces. These requirements are satisfied, for example, by what are known as film-forming amines, which are described below as representative of the required properties of the additives.

In this context, hydrocarbon chains of defined length having one amino group NH, $NH_2$ (monoamines) or a plurality of amino groups (polyamines) and one alkyl chain ($CH_2$) are to be understood as being amines. On account of the free electron pair, the nitrogen atoms of the amino group have a considerable affinity for the protons of metallic cores, such as iron or copper. As a result, the amino groups accumulate through adsorption at the surface of a metal. Therefore, the amines belong to the typical surface-active substances. The bonding of the amino group to the surface leads to a film or seal being formed over the metal surfaces. The aliphatic or hydrophobic part of the amine faces the water or steam and has the effect of repelling moisture and contaminants. Therefore, deposition becomes impossible or at least much more difficult.

Since monoamines have only one point of bonding to the metallic surface, the aliphatic hydrocarbon part leads away from the surface in the manner of a thread.

As the number of amino groups increases, the number of bonding points rises, and therefore so does the bonding strength of the polyamines. The hydrocarbon part of the amine remains in the vicinity of the surface and thereby forms a protective film which is much more stable than that formed by monoamines.

Organic substances are increasingly thermally decomposed as the temperature rises, on account of the chemical bonds breaking. However, there are known amines whose thermal decomposition is only low even at temperatures of 500° C. For metering into steam systems, additives whose service life is as long as possible are suitable. However, the service life of the additives should be at least equal to and if possible greater than the residence time during flow through the device for using steam.

The thermal decomposition of the amines forms $CO$, $CO_2$, $H_2O$, $NH_3$, $H_2$, $N_2$ and $NO_2$, as well as partial decomposition products in the form of short-chain amines, e.g. monoethanolamine etc. Any toxicity, combustibility and corrosiveness (in particular of the shorter-chain amines) is similar to that of the starting product. The end products which are formed after complete decomposition are harmless in the concentrations which are of relevance in the present instance.

This means that, in the case of closed steam systems, it is necessary to have degassing and cleaning features for separating out and removing the decomposition products.

One example of a surface-active amine which may be mentioned is octadecylamine.

The additives may comprise only a single substance, but may also comprise mixtures of different substances, for example including different amines. Furthermore, the additives may be the aqueous solution of this substance or mixture of substances.

The additives may be metered into the steam system periodically or continuously, possibly including as a function of their stability or service life under the specific conditions, the method of operation, the installation load, etc. The metering point 38 (FIGS. 1 to 4) should be located between the device for providing steam and the device for using steam. Metering immediately upstream of the device for using steam is particularly advantageous. In the case of steam/air mixtures, the additive should if possible be metered into the steam. The steam should only then be mixed with the air. Various possible ways of arranging the metering point 38 are illustrated in FIGS. 1 to 4.

LIST OF REFERENCE SYMBOLS

1 Gas turbine installation (comprising 2, 3, 4)
2 Compressor
3 Combustion chamber
4 Gas turbine
5 Generator
6 Exhaust gas, exhaust-gas line
7 Heat recovery steam generator
8 (Common) shaft
9 Intake air line
10 Combustion air
11 Fuel line (for combustion chamber 3)
12 Hot gas
13 Steam turbine installation (comprising 14, 15)
14 High-pressure steam turbine
15 Medium-pressure/low-pressure steam turbine
16 Cold reheater steam line
17 Reheater
18 Hot reheater steam line
19 Coupling
20 Condenser
21 Condensate pump
22 Feed water tank/degassing unit
23 Feed water pump
24 Economizer
25 Steam-collecting drum
26 Evaporator
27 Superheater
28 live-steam line
29 Stack
30 Air cooling system
31 Cooling air cooler
32 Cooling air line
33 Steam (cooling) system
34 Steam cooler
35 Steam blower
36 Steam filter
37 Steam admixing
38 Metering point (for the additive)

What is claimed is:

1. A method for preventing the deposition of contaminants in steam systems, wherein an additive is metered into the steam, adhering to the steam-side surface of the steam system and having the effect of repelling moisture and contaminants, wherein the additive in the steam system forms a film of a defined height on components around which the steam flows, and in that this film height can be controlled during operation by suitable metering of the additive, and in particular can preferably be set within a controlled range (predefined set range).

2. The method as claimed in claim 1, wherein the steam system is an open steam system, a half-open steam system or a closed steam system.

3. The method as claimed claim 1, wherein the steam system comprises at least one device for providing steam and at least one device for using steam, as well as, if appropriate, a device for removing steam.

4. The method as claimed in claim 1, wherein the working medium in the steam system is steam or a steam/air mixture.

5. The method as claimed in one claim 1, wherein the contaminants are, for example, silicates.

6. The method as claimed in claim 1, wherein the additive is a film-forming substance, in particular a film-forming amine (monoamine, polyamine), preferably octadecylamine or related film-forming substances.

7. The method as claimed in one claim 1, wherein the additive is a single substance, a mixture of substances or an aqueous solution of the single substance or of the mixture of substances.

8. The method as claimed in claim 1, wherein the additive has a limited: service life, and in that this service life is at least equal to, and in particular is preferably greater than the residence time during flow through the device for using steam.

9. The method as claimed in claim 1, wherein the thermal decomposition of the additive preferably produces only those substances, and only in those amounts or concentrations, which are comparable to the additive in terms of toxicity, combustibility and corrosiveness.

10. The method as claimed in claim 9, wherein the decomposition products are one or more of the following products: $CO$, $CO_2$, $H_2O$, $NH_3$, $H_2$, $N_2$, $NO_2$, short-chain amines.

11. The method as in claim 1, wherein the additive is metered in periodically or continuously and as a function of its service life.

12. The method of claim 1, wherein the metering of the additive takes place between the device for providing steam and the device for using steam, if possible directly upstream of the device for using steam.

13. A device for preventing the deposition of contaminants in steam systems, wherein an additive is metered into the steam, adhering to the steam-side surface of the steam system and having the effect of repelling moisture and contaminants, comprising:

a steam system having at least one device for providing steam and at least one device for using steam, and also, if appropriate, having at least one device for removing steam, wherein means are provided which allow the controlled admixing of an additive into the steam system, the additive adhering to the steam-side surface of the steam system and having the effect of repelling moisture and contaminants, and these means preferably being equipped with a control unit, particularly preferably for controlling the film height of the additive on the components of the steam system.

14. The device as claimed in claim 13, wherein the means for the controlled admixing are arranged between the device for providing steam and the device for using steam, if possible immediately upstream of the device for using steam.

15. The device as claimed in claim 13, wherein the device for using steam is the device in which the steam has to fulfill a defined cooling or heating function, this device preferably being a gas turbine installation.

16. The device as claimed in claim 13, wherein the device for removing steam uses the steam itself after it has left the device for using steam or feeds the steam for further energy or material utilization, which is preferably a steam generator, a heat recovery steam generator, a steam mains, a steam turbine installation or heat exchanger, blower, filter or the like.

17. The device as claimed in claim 13, wherein half-open steam systems, but in particular closed steam systems, are equipped with degassing and cleaning devices for separating out and removing decomposition products of the additive.

* * * * *